(12) United States Patent
Christiansen et al.

(10) Patent No.: US 11,248,587 B2
(45) Date of Patent: Feb. 15, 2022

(54) WIND TURBINE BLADE AND A WIND TURBINE

(71) Applicant: SIEMENS GAMESA RENEWABLE ENERGY A/S, Brande (DK)

(72) Inventors: Thomas Lehrmann Christiansen, Aalborg (DK); Donato Girolamo, Nørresundby (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 68 days.

(21) Appl. No.: 16/185,241

(22) Filed: Nov. 9, 2018

(65) Prior Publication Data

US 2019/0145383 A1 May 16, 2019

(30) Foreign Application Priority Data

Nov. 14, 2017 (EP) ..................................... 17201644

(51) Int. Cl.
*F03D 80/30* (2016.01)
*F03D 1/06* (2006.01)

(52) U.S. Cl.
CPC ........... *F03D 80/30* (2016.05); *F03D 1/0675* (2013.01); *F05B 2240/21* (2013.01);
(Continued)

(58) Field of Classification Search
CPC ...................................................... F03D 80/30
See application file for complete search history.

(56) References Cited

U.S. PATENT DOCUMENTS

2007/0074892 A1\* 4/2007 Hibbard ................. H02G 13/80
174/117 FF
2008/0073098 A1 3/2008 Llorente Gonzalez et al.
(Continued)

FOREIGN PATENT DOCUMENTS

CN 101094986 A 12/2007
CN 102123848 A 7/2011
(Continued)

OTHER PUBLICATIONS

European Search Report for related application No. 17201644.6; dated May 11, 2018; 7 pages.
(Continued)

*Primary Examiner* — Courtney D Heinle
*Assistant Examiner* — Andrew J Marien
(74) *Attorney, Agent, or Firm* — Schmeiser, Olsen & Watts LLP

(57) ABSTRACT

Provided is a wind turbine blade for a wind turbine, including a web extending along a longitudinal direction of the blade, an electrically conductive beam extending along the longitudinal direction of the blade and being connected to the web, a lightning conductor extending along the longitudinal direction of the blade and being attached to the web, and a ply including carbon fibers, wherein the ply is attached to both the lightning conductor and the beam to electrically connect the lightning conductor to the beam. This has the advantage that an extensive and a continuous electrical connection between the lightning conductor and the beam is provided and that a plurality of cables electrically connecting the lightning conductor with the beam may be substituted.

9 Claims, 6 Drawing Sheets

(52) U.S. Cl.
CPC ... *F05B 2240/30* (2013.01); *F05B 2280/2006* (2013.01); *F05B 2280/50* (2013.01); *F05B 2280/6001* (2013.01); *F05B 2280/6013* (2013.01)

(56) References Cited

U.S. PATENT DOCUMENTS

| | | | |
|---|---|---|---|
| 2009/0196751 A1* | 8/2009 | Jacobsen | F03D 80/30 416/146 R |
| 2009/0257881 A1* | 10/2009 | Ostergaard Kristensen | F03D 80/30 416/229 R |
| 2011/0171032 A1 | 7/2011 | Hancock et al. | |
| 2012/0134826 A1 | 5/2012 | Arocena De La Rua et al. | |
| 2012/0194960 A1 | 8/2012 | Kristensen et al. | |
| 2012/0315147 A1* | 12/2012 | Rindt | F03D 80/30 416/230 |
| 2015/0292479 A1 | 10/2015 | Ohlerich et al. | |
| 2016/0177926 A1* | 6/2016 | Akhtar | F03D 1/0675 416/229 A |
| 2016/0327028 A1 | 11/2016 | March Nomen et al. | |
| 2017/0058869 A1* | 3/2017 | Caruso | F03D 1/0675 |
| 2018/0112649 A1* | 4/2018 | Shain | F03D 80/40 |
| 2019/0195203 A1* | 6/2019 | Fujioka | F03D 1/0675 |
| 2020/0056596 A1* | 2/2020 | Christiansen | B29C 70/72 |

FOREIGN PATENT DOCUMENTS

| | | | |
|---|---|---|---|
| EP | 1826402 A1 | 8/2007 | |
| EP | 2110552 A1 | 10/2009 | |
| EP | 2930355 A1 | 10/2015 | |
| WO | 2005050808 A1 | 6/2005 | |
| WO | WO 2005050808 A1 | 6/2005 | |

OTHER PUBLICATIONS

European Search Report for application No. 17201644.6, dated May 11, 2018.
Non-English Chinese Office Action dated Jul. 13, 2020 for Application No. 201811353145.4.

* cited by examiner

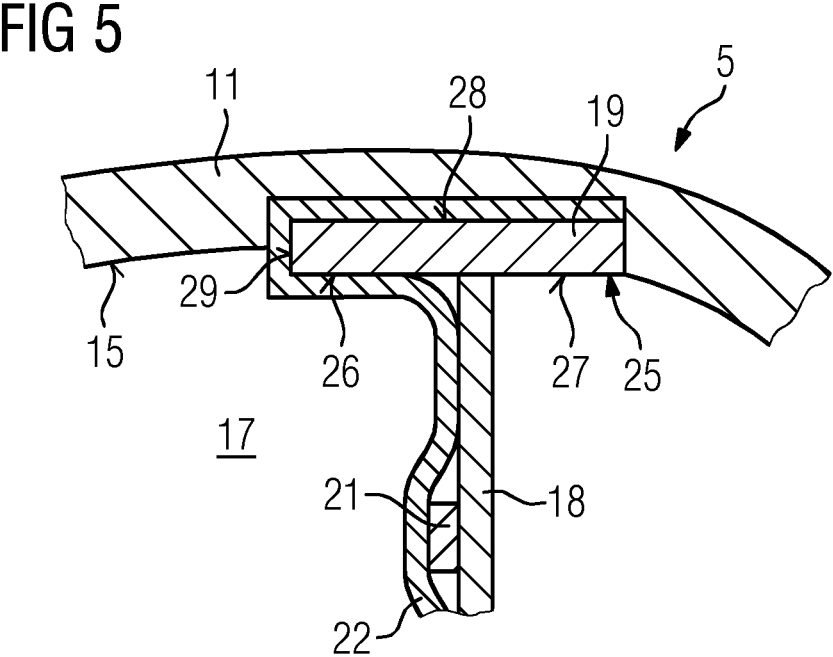
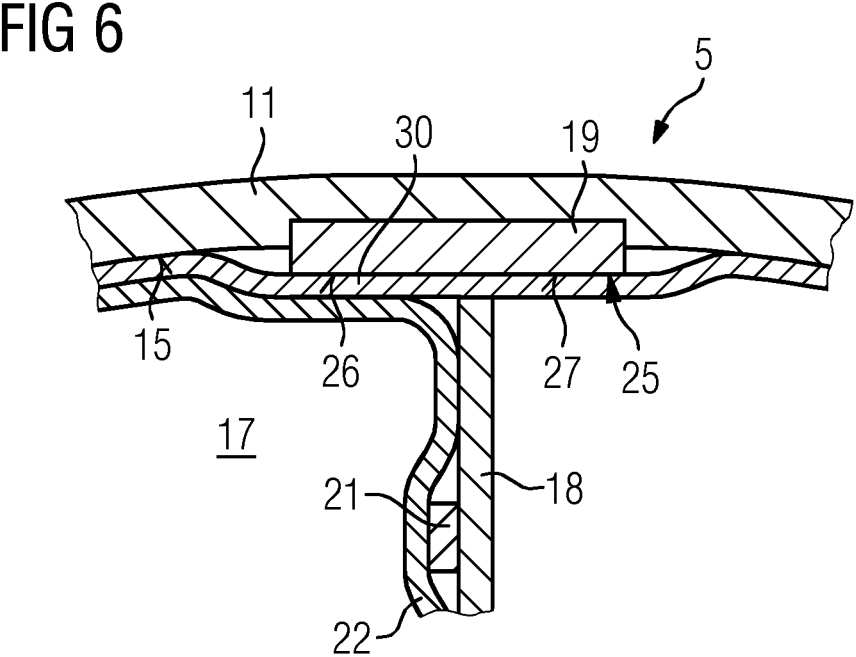

WIND TURBINE BLADE AND A WIND TURBINE

CROSS-REFERENCE TO RELATED APPLICATIONS

This application claims priority to European Application No. 17201644.6, having a filing date of Nov. 14, 2017 the entire contents of which are hereby incorporated by reference.

FIELD OF TECHNOLOGY

The following relates to a wind turbine blade for a wind turbine and a wind turbine.

BRIEF DESCRIPTION

Modern wind turbine rotor blades are built from fiber-reinforced plastics. A rotor blade typically comprises an airfoil having a rounded leading edge and a sharp trailing edge. The rotor blade is connected with its blade root to a hub of the wind turbine. Further, the rotor blade is connected to the hub by means of a pitch bearing that allows a pitch movement of the rotor blade. Long rotor blades experiences high wind forces.

Rotor blades may be made of two half-shells connected to each other. Further, a web, in particular a shear web, may be arranged between the two half-shells to reinforce the rotor blade. The shear web may be arranged between two beams, in particular spar caps, and may be connected thereto.

Rotor blades are the most exposed part of the wind turbine with respect to lightning strikes. Therefore, lightning protection systems (LPS) may be provided. A lightning protection system may comprise a lightning conductor which may be connected to the web and which may extend along a longitudinal direction of the web. The lightning conductor may be electrically connected to a grounding system of the wind turbine blade. Further, attachment points for the lightning—commonly known as receptors—may be arranged along a blade surface and connected to the lightning conductor.

When a lightning strike is intercepted by the lightning protection system, the electrical current is transferred to the ground by means of the lightning conductor. However, flash-overs between the lightning conductor and the beams which for example may comprise carbon fibers being electrical conductive may occur since the beams may provide an alternative path to the ground. Moreover, mutual induction may cause currents in the beams. These effects may cause structural damage to the beams and possibly catastrophic failure of the blade. To prevent damage of the beams electrical connections between the lightning conductor and the beams may be provided.

SUMMARY

An aspect relates to providing an improved wind turbine blade.

Accordingly, a wind turbine blade for a wind turbine is provided. The wind turbine blade comprises a web extending along a longitudinal direction of the blade, an electrically conductive beam extending along the longitudinal direction of the blade and being connected to the web, a lightning conductor extending along the longitudinal direction of the blade and being attached to the web, and a ply comprising carbon fibers, wherein the ply is attached to both the lightning conductor and the beam to electrically connect the lightning conductor to the beam.

In contrast to known wind turbine blades, an extensive and continuous electrical connection between the lightning conductor and the beam is provided. This has the advantage that e.g. a plurality of cables electrically connecting the lightning conductor with the beam may be substituted. The ply may be designed as structural improvement of the web. Hence, only minor adjustments of a wind turbine blade manufacturing process are required. Thus, a production of such a wind turbine blade is simplified. Further, malfunctions of such an electrical connection may be reduced since the ply provides a large contact surface to the lightning conductor and to the beam. Furthermore, a critical connection from metal to carbon prone to arching is provided away from the beam and, hence, minimizing the risk of structurally critical damage at the beam. Moreover, the ply serves as an effective reinforcement element since a ply having carbon fibers is lightweight compared to a ply made of a metal.

The beam may comprise carbon fibers and/or may be e.g. a spar cap. In particular, the beam may be made of a composite material, in particular carbon-fiber-reinforced polymer (CFRP), wherein the electrical conductivity may be achieved, e.g. merely, by means of the carbon fibers. Further, the beam may be a first beam and/or a first spar cap.

The web may be e.g. a shear web. Further, the web may be a support structure of the wind turbine blade. Preferably, the web is configured to prevent crippling or buckling of the wind turbine blade. Preferably, the web is forming a wall, rib or stringer arranged between an inner surface of a first half-shell of an outer blade shell and an inner surface of a second half-shell of the outer blade shell. Preferably, the web is provided as a one-piece body, e.g. made of composite material, in particular fiber reinforced plastic material, and/or wood (e.g. plywood). Preferably, the web is not electrically conductive and/or insulated.

Preferably, the wind turbine blade comprises receptors for the lightning which are arranged along an outer surface of the outer blade shell and which are electrically connected to the lightning conductor.

The "ply" may mean a structural element having a length, a width, and a thickness, wherein an amount of the length and an amount the width is at least 5, 10, 15, 20, 30, 40 or more times larger than an amount of the thickness. The ply may comprise a plurality of ply segments being arranged side by side, wherein each ply segment is attached to the lightning conductor and the beam. Preferably, the ply segments may be provided at intervals. In particular, gaps between ply segments (distance between the ply segments) may be provided. Additionally or alternatively, overlaps between the ply segments may be provided. Alternatively, the ply may be a one-piece element. In particular, the ply may be a carbon ply.

The lightning conductor may be a down conductor. The lightning conductor may comprise metal. In particular, two or more lightning conductors may be provided which are arranged parallel each electrically connected to the beam. Preferably, only one lightning conductor is provided.

Preferably, a connection between the ply and the beam and/or the ply and the lightning conductor is made by means of vacuum infusion of the blade. Thus, preferably no additional connections need to be done after a blade casting. Preferably, the carbon fibers of the ply which are electrically conductive are attached to carbon fibers of the beam such that a current may flow from the lightning conductor to the beam.

According to an embodiment, the wind turbine blade comprises a blade tip and a blade root, wherein the lightning conductor extends from the blade tip to the blade root, and wherein the ply has a length being at least 1%, 10%, 20%, 30%, 40%, 50%, 60%, 70%, 80%, 90% or 100% of a length of the lightning conductor.

This has the advantage that a significant amount of electrical power may be transferred by the ply. Preferably, the blade tip and the blade root are comprised by the outer blade shell of the wind turbine blade in particular having the first and the second half-shell.

According to a further embodiment, the ply is attached to the lightning conductor and the beam along the ply's total length.

This has the advantage that a reliable contact between the ply and the lightning conductor and the ply and the beam may be provided. Moreover, a current density in a connection is minimized, in particular by means of a continuous equipotential bonding, enabling a simple design of a connection interface.

According to a further embodiment, the ply is attached to the beam by means of a conductive layer, in particular a metallic layer, a carbon ply portion or a hybrid carbon-metallic mat.

This has the advantage that the electrical conductivity of the connection between the ply and the beam may be improved. Preferably, the conductive layer comprises metallic copper and/or an aluminum mesh. Alternatively, the conductive layer may be a carbon layer.

According to a further embodiment, the wind turbine blade comprises a further beam having carbon fibers, being electrically conductive, and which is connected to the web, wherein the ply is attached to the further beam for electrically connecting the lightning conductor to the further beam.

This has the advantage that flash-overs between the lightning conductor and the further beam may be avoided. The further beam may be a second spar cap and/or a second beam.

According to a further embodiment, the web is located between the beam and the further beam forming an I-shaped cross section.

This has the advantage that a stiff I-profile may be provided inside the blade shell such that a stiff and lightweight wind turbine blade may be provided. Preferably, a further web may be provided arranged parallel to the web and in particular connected to the beam and the further beam.

According to a further embodiment, the wind turbine blade comprises a further ply having carbon fibers electrically connecting the beam to the further beam, which is arranged parallel to the ply, and which is attached to the beam and the further beam.

This has the advantage that a further electrical connection between the beam and the further beam reinforcing the web may be provided. In particular, a second lightning conductor extending along the longitudinal direction of the blade may be provided, wherein the first lightning conductor is arranged at one side of the web and the second lightning conductor is arranged at the other side of the web being averted from the one side. The second lightning conductor may be attached to the web and the further ply. Preferably, the second lighting conductor is covered by the further ply.

According to a further embodiment, in a cross-sectional view the ply is wrapped around the beam.

This has the advantage that the electrical connection between the ply and the beam may be improved. Preferably, at least 30%, 40%, 50%, 60%, 70%, 80% or more of an outer surface of the beam is covered by the ply.

According to a further embodiment, the wind turbine blade comprises an outer blade shell, wherein the beam is connected to the outer blade shell.

Preferably, the beam is connected to the first half-shell and the further beam is connected to the second half-shell. Preferably, the first half-shell and the second half-shell are connected together or may be provided as a one-piece element.

Further, a wind turbine having such a wind turbine blade is provided.

"Wind turbine" presently refers to an apparatus converting the wind's kinetic energy into rotational energy, which may again be converted to electrical energy by the apparatus.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with references to the following Figures, wherein like designations denote like members, wherein:

FIG. 5 shows a detail view IV from FIG. 3 in accordance with a further embodiment;

FIG. 6 shows a detail view IV from FIG. 3 in accordance with a further embodiment;

In the Figures, like reference numerals designate like or functionally equivalent elements, unless otherwise indicated.

DETAILED DESCRIPTION

Figure 1:
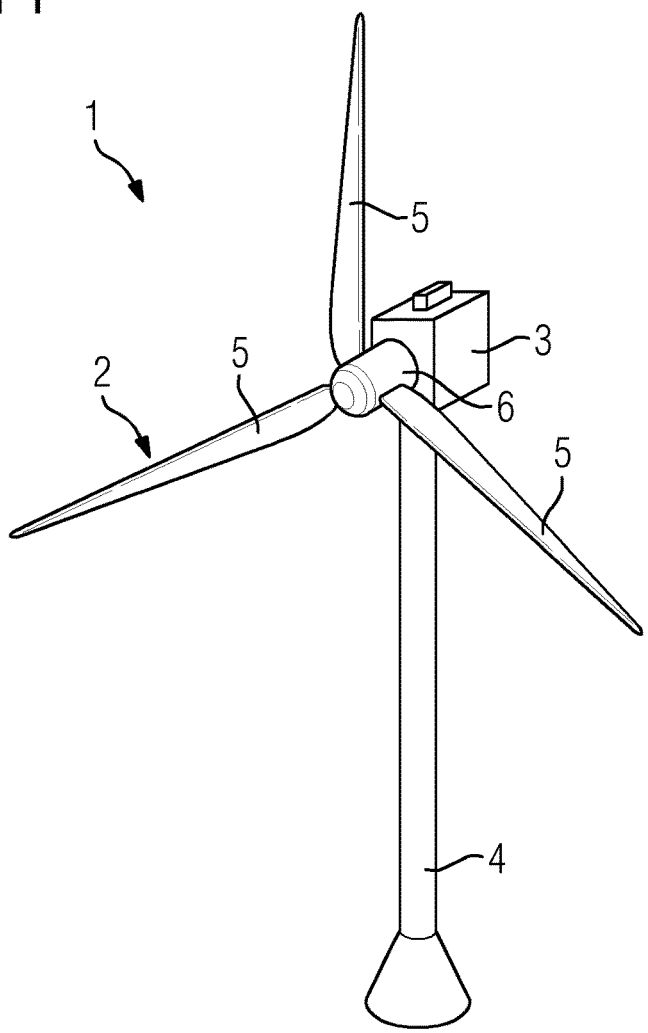
FIG. 1 shows a perspective view of a wind turbine according to one embodiment.

FIG. 1 shows a wind turbine 1. The wind turbine 1 comprises a rotor 2 connected to a generator (not shown) arranged inside a nacelle 3. The nacelle 3 is arranged at the upper end of a tower 4 of the wind turbine 1.

The rotor 2 comprises three wind turbine blades 5. The wind turbine blades 5 are connected to a hub 6 of the wind turbine 1. Rotors 2 of this kind may have diameters ranging from, for example, 30 to 200 meters or even more. The wind turbine blades 5 are subjected to high wind loads. At the same time, the wind turbine blades 5 need to be lightweight. For these reasons, wind turbine blades 5 in modem wind turbines 1 are manufactured from fiber-reinforced composite materials. Therein, glass fibers are generally preferred over carbon fibers for cost reasons. Oftentimes, glass fibers in the form of unidirectional fiber mats are used.

Figure 2:
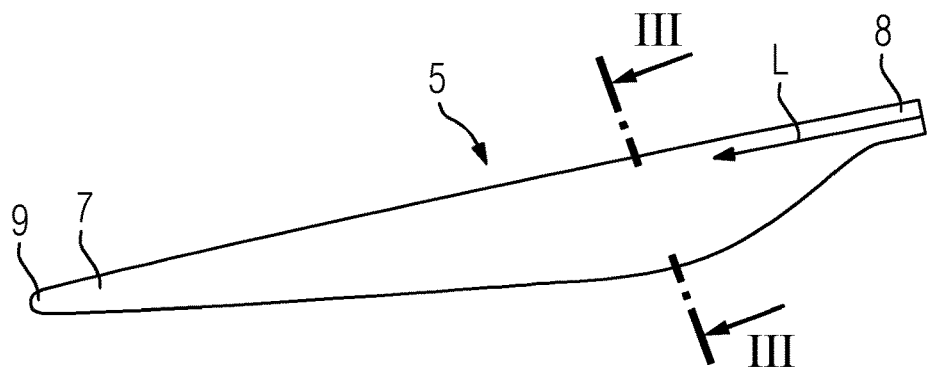
FIG. 2 shows a perspective view of a wind turbine blade of the wind turbine according to FIG. 1.

FIG. 2 shows a wind turbine blade 5. The wind turbine blade 5 comprises an aerodynamically designed portion 7 which is shaped for optimum exploitation of the wind energy and a blade root 8 for connecting the wind turbine blade 5 to the hub 6. Further, the wind turbine blade 5 comprises a blade tip 9 which is arranged averted from the blade root 8. The wind turbine blade 5 extends in a longitudinal direction L.

Figure 3:
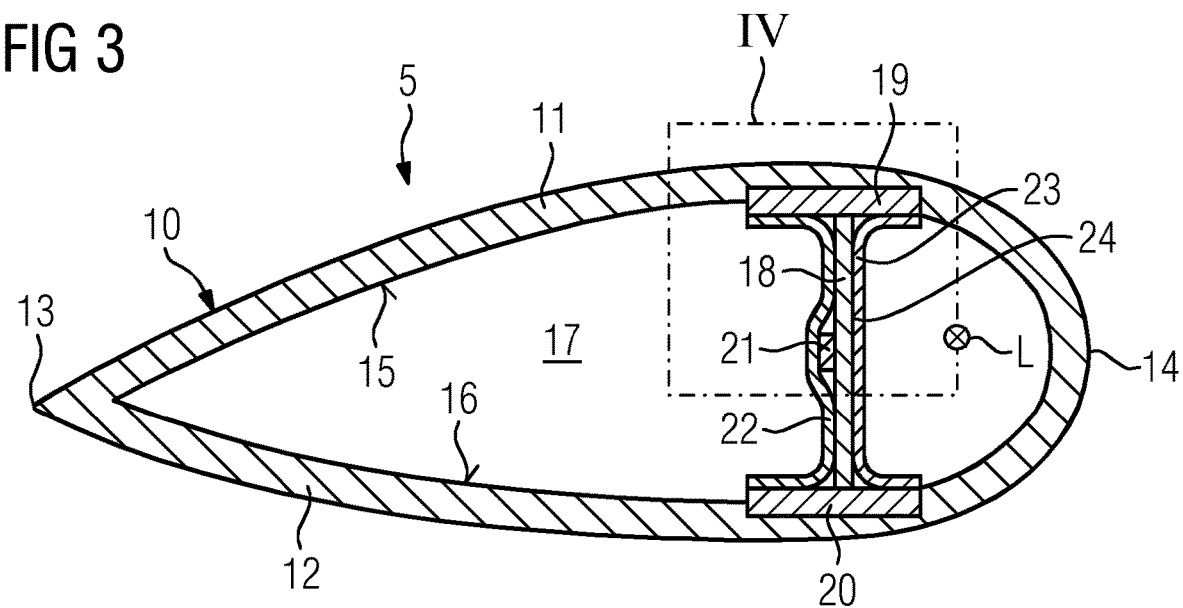
FIG. 3 shows a cross-sectional view from FIG. 2.

FIG. 3 shows a cross-sectional view from FIG. 2. The wind turbine blade 5 comprises an outer blade shell 10 comprising a first half-shell 11 and a second half-shell 12 which are connected together at one side 13 of the wind turbine blade 5, in particular at a trailing edge, and at the other side 14 of the wind turbine blade 5, in particular at a leading edge, to form the outer shell 10 of the wind turbine blade 5. The blade shell 10 may comprise composite fiber material. Further, the first half-shell 11 and the second half-shell 12 may be glued together. Alternatively, the blade shell 10 may be provided as a one-piece element.

The first half-shell 11 comprises an inner surface 15 and the second half-shell 12 comprises an inner surface 16 being opposite to each other, wherein an inner space 17 of the wind turbine blade 5 is defined by the inner surfaces 15, 16. A web 18 is located inside the inner space 17 extending from the inner surface 15 of the first half-shell 11 to the inner surface 16 of the second half-shell 12. The wind turbine blade 5 further comprises a first beam 19 connected to the first half-shell 11 and a second beam 20 connected to the second half-shell 12. The first and the second beam 19, 20 are electrically conductive and extend along the longitudinal direction L.

The web 18 is located between the first beam 19 and the second beam 20, wherein the web 18 and the beams 19, 20 are forming an I-shaped cross section. The web 18 and the beams 19, 20 are forming a support structure preventing breaking or crippling of the wind turbine blade 5. The web 18 extends along the longitudinal direction L of the blade 5. Further, a lightning conductor 21 is provided extending along the longitudinal direction L and being attached to the web 18. Furthermore, a ply 22 comprising carbon fibers is provided.

The ply 22 is attached to both the lightning conductor 21 and the first beam 19 to electrically connect the lightning conductor 21 to the first beam 19. Preferably, the ply 22 is also connected to the second beam 20. Moreover, a further ply 23 is provided comprising carbon fibers electrically connecting the first beam 19 with the second beam 20. The further ply 23 is arranged parallel to the ply 22 and is attached to the first beam 19 and the second beam 20. The further ply 23 is arranged at a side 24 of the web 18 which is averted from the ply 22.

Alternatively, the blade 5 may be provided without the further ply 23.

Figure 4:
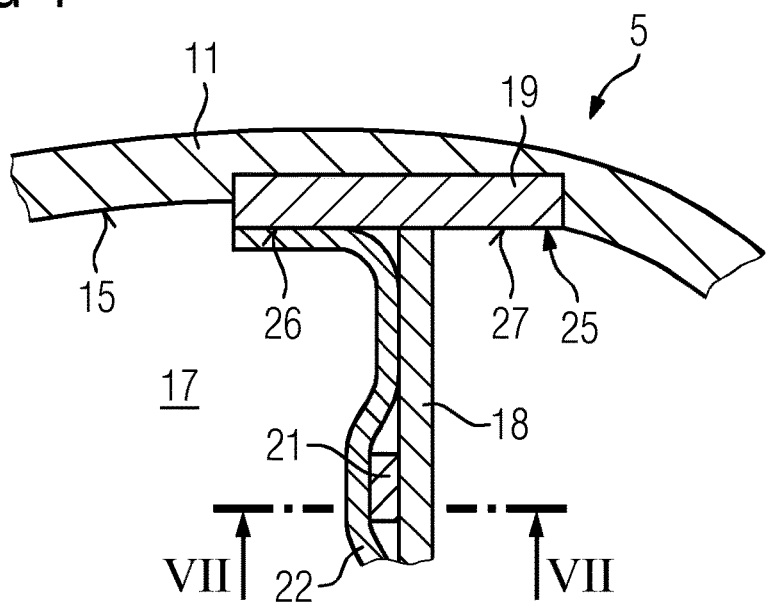
FIG. 4 shows a detail view IV from FIG. 3 in accordance with one embodiment.

FIG. 4 shows a detail view IV from FIG. 3. Contrary to FIG. 3 the further ply 23 (see FIG. 3) is not provided. A surface 25 of the first beam 19 which faces the web 18 is divided by the web 18 in a first part 26 (left part) and a second part 27 (right part). The ply 22 only covers the first part 26 of all surfaces of the beam 19 and is connected thereto. "Cover" may mean that the ply 22 is directly or indirectly connected to the beam 19 and that an overlap is provided.

Furthermore, the web 18 may be connected to the first beam 19 and/or the second beam 20 by means of a connecting element serving as a receptacle for the web 18 (not shown).

FIG. 5 shows a detail view IV from FIG. 3 of a further embodiment of the wind turbine blade 5. Contrary to FIG. 4, the ply 22 is wrapped around the beam 19 such that only the part 26, a surface 28 which is averted from the surface 25, and a surface 29 connecting the part 26 and the surface 28 are covered by the ply 22. Alternatively (not shown), the ply 22 may be wrapped completely around the beam 19 such that also the part 27 of the surface 25 is covered by the ply 22.

FIG. 6 shows a detail view IV from FIG. 3 of a further embodiment of the wind turbine blade 5. Contrary to FIG. 4, the ply 22 is attached to the first beam 19 by means of a conductive layer 30, in particular a metallic or carbon layer. Such a metallic layer may comprise metallic cooper and/or an aluminum mesh.

Figure 7:
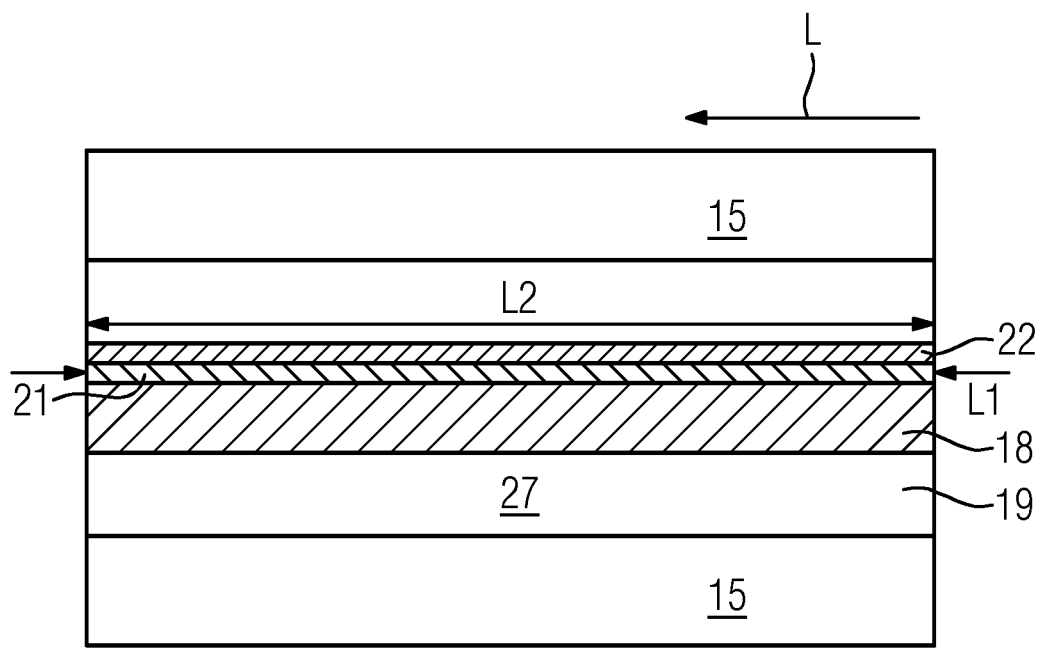
FIG. 7 shows a cross-sectional view VII-VII from FIG. 4.

FIG. 7 shows a cross-sectional view VII-VII of FIG. 4. The lightning conductor 21 has a length L1 extending essentially from the blade tip 9 to the blade root 8 (see FIG. 2). Further, the ply 22 has a length L2 in longitudinal direction L. The ply 22 is attached to the lightning conductor 21 and the first beam 19 along the ply's 22 total length L2.

In particular, the ply 22 has the length L2 being at least 10%, 20%, 30%, 40%, 50%, 60%, 70%, 80%, 90% or 100% of a length L1 of the lightning conductor 21.

Figure 8:
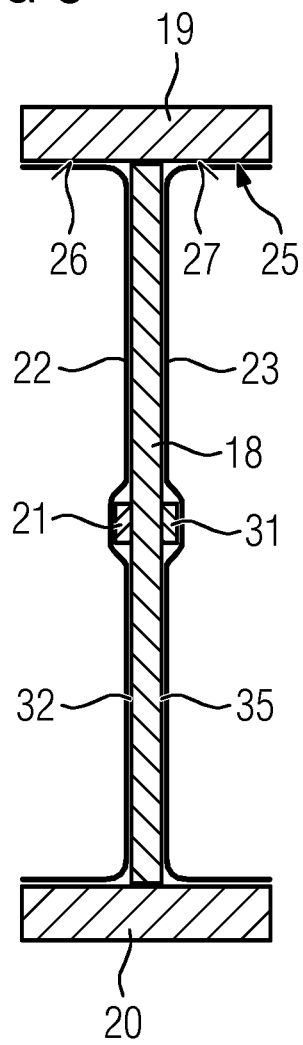
FIG. 8 shows a partial cross-sectional view of a further embodiment of the wind turbine blade.

FIG. 8 shows a partial cross-sectional view of a further embodiment of the wind turbine blade 1. In contrast to FIG. 4, a second lightning conductor 31 extending along the longitudinal direction L of the blade 5 is provided, wherein the first lightning conductor 21 is arranged at one side 32 of the web 18 and the second lightning conductor 31 is arranged at the other side 35 of the web 18 being averted from the one side 32. The second lighting conductor 31 is attached to the web 18 and the further ply 23. The second lightning conductor 31 is covered by the further ply 23. The further ply 23 is arranged as described in FIG. 3.

Figure 9:
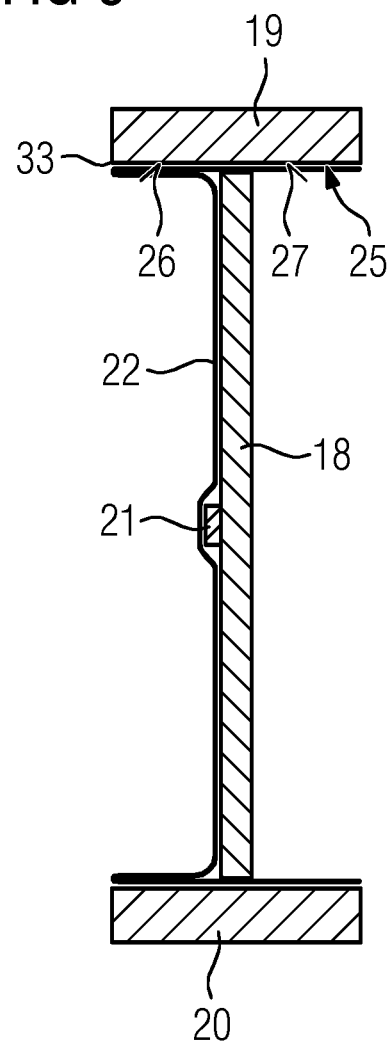
FIG. 9 shows a partial cross-sectional view of a further embodiment of the wind turbine blade.

FIG. 9 shows a partial cross-sectional view of a further embodiment of the wind turbine blade 1. In contrast to FIG. 4, the ply 22 contacts the complete surface 25, wherein the ply 22 is bended at an edge 33 of the beam 19 such that the part 27 is covered two-ply by the ply 22 and extends further towards the lightning conductor 21. Further, the web 18 is connected to the beam 19 by means of the ply 22.

Figure 10:
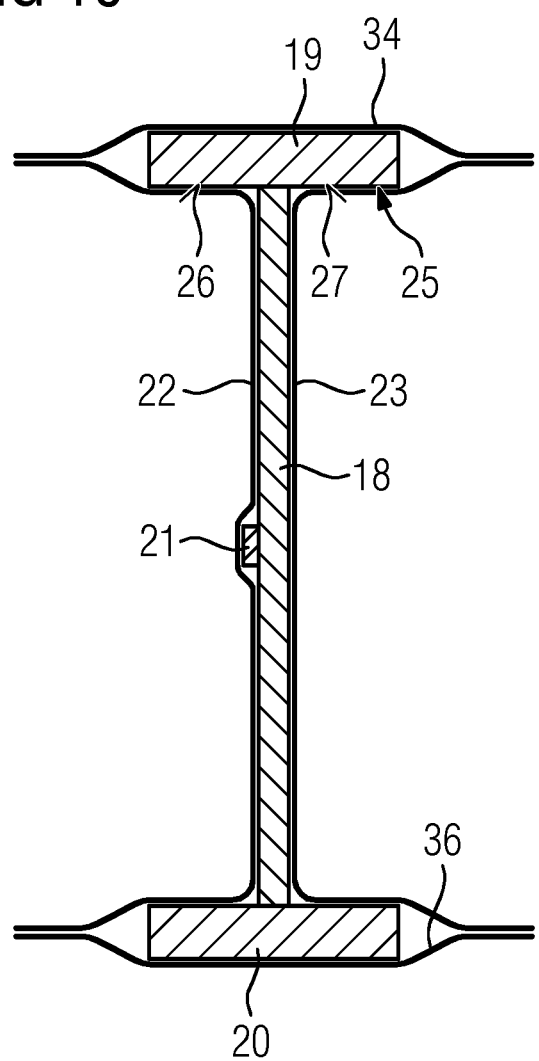
FIG. 10 shows a partial cross-sectional view of a further embodiment of the wind turbine blade.

FIG. 10 shows a partial cross-sectional view of a further embodiment of the wind turbine blade 1. In contrast to FIG. 3, the beam 19 is connected to the half-shell 11 by means of a ply 34, in particular having carbon fibers and being electrically conductive. The ply 34 covers the complete surface 28 and is connected thereto. The ply 34 attaches the ply 22 and the ply 23. In particular, the beam 20 is connected to the half-shell 12 by means of a ply 36, in particular having carbon fibers and being electrically conductive. The ply 36 may be provided equally to the ply 34.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A wind turbine blade for a wind turbine, comprising
a web extending along a longitudinal direction of the blade,
an electrically conductive beam extending along the longitudinal direction of the blade and being connected to the web, wherein the beam has a beam surface, wherein the web intersects the beam surface where the beam is connected to the web,
a lightning conductor extending along the longitudinal direction of the blade and being attached to the web, and
a ply comprising carbon fibers, the ply including a first edge along the longitudinal direction of the blade and a second edge along the longitudinal direction of the blade, wherein the ply is a structural component of the web, attached to both the lightning conductor and the beam to electrically connect the lightning conductor to the beam, wherein the ply covers a first part of the beam surface facing the web on a first side of the web,
wherein the beam has a second part of the beam surface facing the web on a second side of the web, and a third part of the beam surface adjacent to an inner surface of the blade,
wherein the ply extends along the first part of the beam surface and third part of the beam surface, such that the first part of the beam surface and third part of the beam surface are covered by the ply,
wherein the second side of the beam surface is not covered by the ply, and
wherein at least one of the first edge and second edge terminate on the beam surface.

2. The wind turbine blade according to claim 1, having a blade tip and a blade root, wherein the lightning conductor extends from the blade tip to the blade root, and wherein the ply has a length that extends along at least a portion of a length of the lightning conductor.

3. The wind turbine blade according to claim 1, wherein the ply is attached to the lightning conductor and the beam along the ply's total length.

4. The wind turbine blade according to claim 1, having a further beam comprising carbon fibers, being electrically conductive, and which is connected to the web, wherein the ply is attached to the further beam for electrically connecting the lightning conductor to the further beam.

5. The wind turbine blade according to claim 4, wherein the web is located between the beam and the further beam forming an I-shaped cross section.

6. The wind turbine blade according to claim 4, having a further ply comprising carbon fibers electrically connecting the beam to the further beam, which is arranged parallel to the ply, and which is attached to the beam and the further beam.

7. The wind turbine blade according to claim 1, having an outer blade shell, wherein the beam is connected to the outer blade shell.

8. A wind turbine having a wind turbine blade according to claim 1.

9. A wind turbine blade for a wind turbine, comprising
a web extending along a longitudinal direction of the blade;
an electrically conductive beam extending along the longitudinal direction of the blade and being connected to the web, wherein the beam is located between the web and an inner surface of the blade, wherein the beam has a first beam surface facing the web on one side of the web, a second beam surface facing another side of the web, and a third beam surface adjacent to the inner surface of the blade;
a lightning conductor extending along the longitudinal direction of the blade and being attached to the web; and
a ply comprising carbon fibers, wherein the ply is attached to both the lightning conductor and the beam to electrically connect the lightning conductor to the beam, wherein the ply extends along the first beam surface and third beam surface such that the first beam surface and third beam surface are covered by the ply.

* * * * *